United States Patent [19]

Motta et al.

[11] Patent Number: 4,692,986

[45] Date of Patent: Sep. 15, 1987

[54] RAZOR CARTRIDGE WITH SHAVING AID

[75] Inventors: Vincent C. Motta, West Norwalk; Frank A. Ferraro, Trumbull, both of Conn.

[73] Assignee: Warner Lambert Company, Morris Plains, N.J.

[21] Appl. No.: 780,767

[22] Filed: Sep. 27, 1985

[51] Int. Cl.[4] ............................................ B23P 11/02

[52] U.S. Cl. ........................................ 29/451; 29/450; 30/34 R; 30/90

[58] Field of Search .................. 30/34.2, 34 R, 41, 90, 30/47; 29/450, 451

[56] References Cited

U.S. PATENT DOCUMENTS

| | | | |
|---|---|---|---|
| 2,917,056 | 12/1959 | Dolan, Sr. | 30/90 X |
| 4,170,821 | 10/1979 | Booth | 30/41 |
| 4,586,255 | 5/1986 | Jacobson | 30/90 X |

*Primary Examiner*—Paul A. Bell
*Assistant Examiner*—Willman Fridie
*Attorney, Agent, or Firm*—Howard Olevsky; Stephen Raines

[57] ABSTRACT

A razor cartridge having a shaving aid secured frictionally to a face-engaging surface of the cartridge including method of manufacture.

5 Claims, 7 Drawing Figures

RAZOR CARTRIDGE WITH SHAVING AID

FIELD OF THE INVENTION

The present invention relates to wet shaving and relates in particular to so-called safety razors of the wet shaving category.

BACKGROUND OF THE INVENTION

More specifically, the invention relates to wet shaving safety razors which include a shaving aid built into or attached to the razor in one fashion or another.

Usually the shaving aid is incorporated in one of the face-engaging surfaces of the cartridge portion of the razor, i.e., the cap or the guard bar.

Typical prior art razors incorporating shaving aids in the cap or in the guard bar are disclosed and described in U.S. Pat. No. 4,170,821 entitled RAZOR CARTRIDGES issued Oct. 16, 1979, to A. R. Booth and assigned to Warner-Lambert Company, U.K. Pat. No. 1,157,640 entitled IMPROVEMENTS IN OR RELATING TO SAFETY SHAVING RAZORS issued July 9, 1969, to Calmic Limited, and Italian Pat. No. 991,064 entitled SAFETY RAZOR COUPLED WITH A SKIN SOAP DISPENSER CLOSE TO THE BLADE filed July 9, 1973, by Raffaele Tipaldi.

The U.S. '821 patent employs a shaving aid in the form of polyethylene oxide as well as other preparations incorporated into the razor cartridge in a number of ways.

The U.K. '640 patent shows a sponge-like strip impregnated with a hair softener mounted on the top of the razor.

The Italian '064 reference shows a soap dispenser mounted in front of the blade edge.

OBJECT OF THE INVENTION

The object of the present invention is the provision of a wet shaving safety razor cartridge incorporating a shaving aid in the face-engaging surface of the cartridge cap whose structure and method of manufacture lends itself to modern high-speed mass production methods.

A special feature of the invention is the provision of a shaving aid receptacle and method of inserting the aid into the receptacle with sufficient manufacturing speed and economy to allow incorporation of the aid into low cost disposable razors in highly competitive fashion.

SUMMARY OF THE INVENTION

A razor cartridge having at least one face-engaging surface formed with a receptacle for receiving and retaining an elongate shaving aid embracing certain principles of the present invention may comprise an open-ended recess having a bottom wall formed in said face-engaging surface, a plurality of spaced clips formed integrally with said face-engaging surface, said clips overhanging said recess, a plurality of bulges formed in said bottom wall in the region of said clips whereby the bulges and the clips cooperate to receive the elongate shaving aid and retain the aid frictionally.

A method of attaching a molded elongate shaving aid to a face-engaging surface of a razor cartridge embracing certain other principles of the invention may comprise the steps of creating a track in said face-engaging surface, separating the elongate aid into individual aid inserts, feeding an insert into said track, and retaining said insert in said track frictionally.

BRIEF DESCRIPTION OF THE DRAWINGS

Other features and advantages of the present invention will become more apparent from an examination of the succeeding specification when read in conjunction with the appended drawings, in which.

DESCRIPTION OF THE PREFERRED EMBODIMENT

Figure 1:
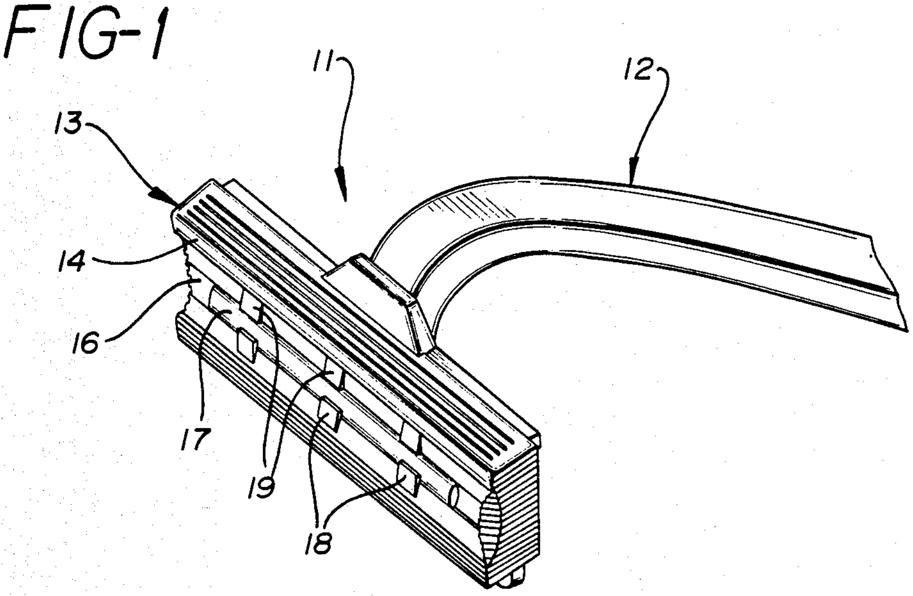
FIG. 1 is a perspective view of a razor cartridge with a shaving aid insert in place.

Referring now in detail to the drawings, the reference numeral 11 designates a low cost disposable razor having a handle 12 and a cartridge 13 (fixed to or separable from the handle in well-known fashion).

The cartridge includes a face-engaging surface 14 formed with a recess 16 defining a receptacle for a shaving aid insert 17.

Figure 4:
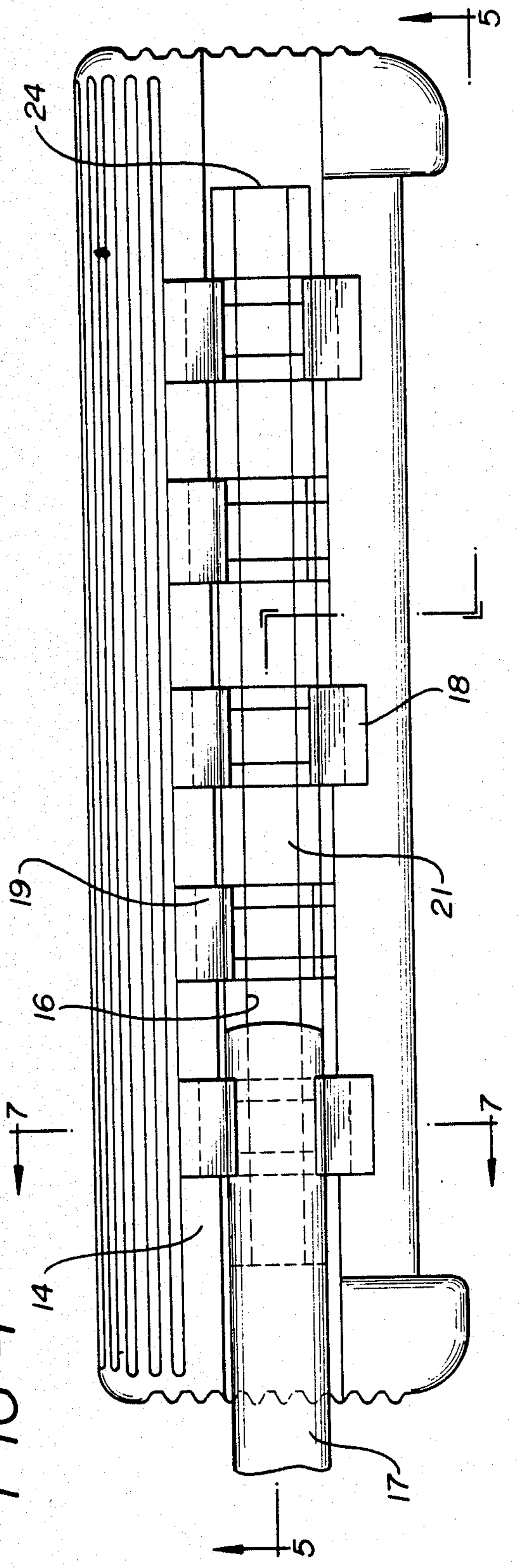
FIG. 4 is a top view, enlarged, showing a shaving aid insert partially received in the insert receptacle.
Figure 5:
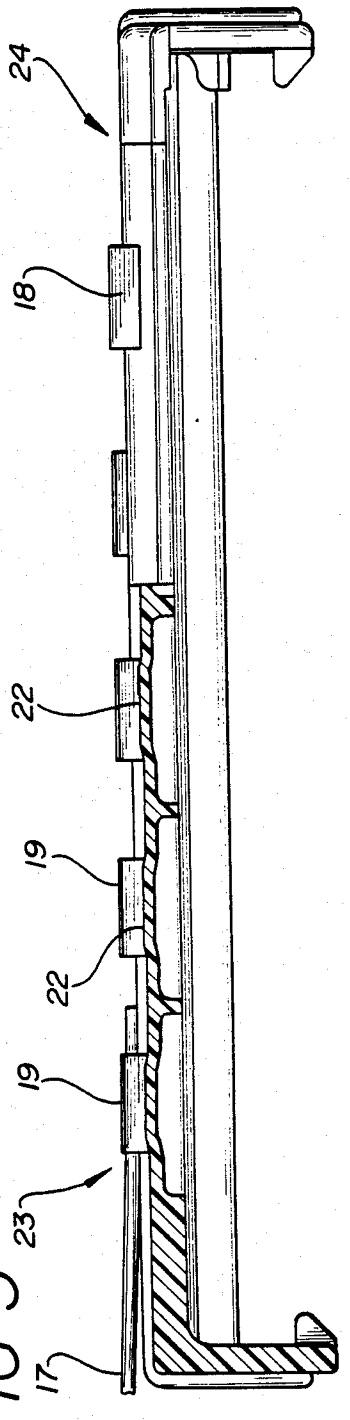
FIG. 5 is a vertical section of FIG. 4 as viewed in the staggered line labeled 5—5.

The recess is open-ended and defines a track for receiving the shaving aid insert 17 fed into the track from the left end of the track as is apparent in FIGS. 4 and 5.

To facilitate retention of the insert within the track, the face-engaging surface 14 is formed with spaced clips 18–19 (in this case molded integrally with the cartridge) which overlay the track and which project toward one another from opposite sides of the track. While the disclosed embodiment of the invention shows the clips opposite one another, it is not necessary that they be so arranged. The clips may be staggered or project alternately from side to side.

In the region of the clips 18–19, the bottom wall 21 of the recess 16 is formed with bulges 22 (see FIG. 6) which cooperate with the clips 18–19 to accomplish two important occurrences.

Figure 6:
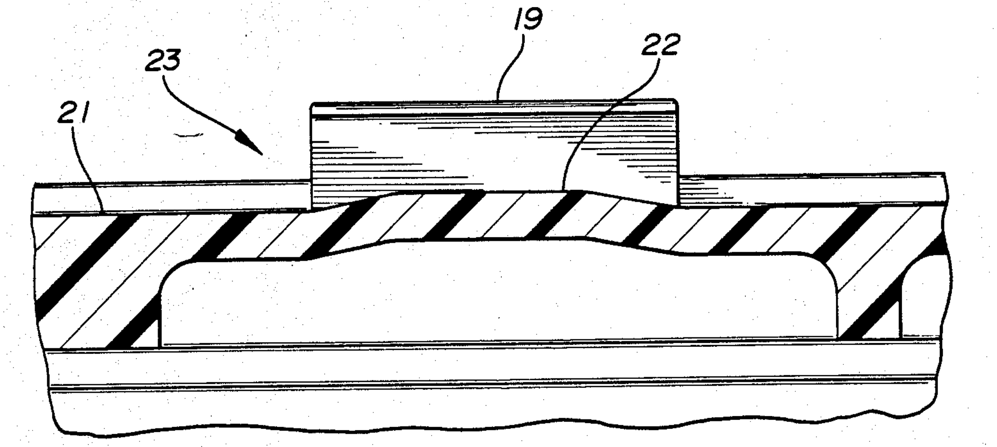
FIG. 6 is an enlarged view of a portion of FIG. 5 showing a bulge in the bottom wall of the aid receptacle.

First, the inlet side of the bulge, as indicated at 23 in FIGS. 5 and 6, provides a flared opening creating a "lead in" for the aid as it is being inserted.

Secondly, the clips 18–19, singly or in pairs, cooperate with mating bulges 22 to create a restriction to facilitate the creation of friction to retain the shaving aid insert in place.

Figure 7:
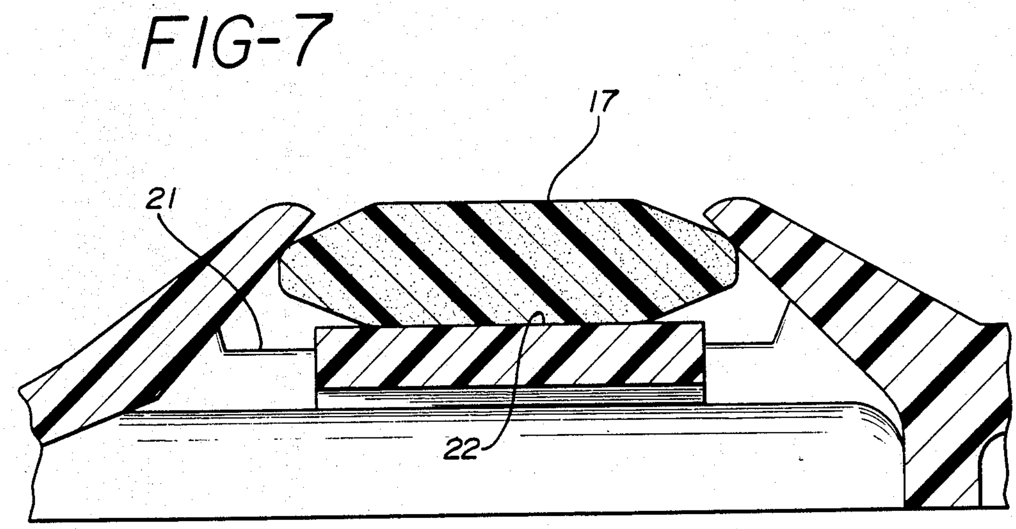
FIG. 7 is a sectional view, enlarged, of FIG. 4 in the plane of the line 7—7.

As stated earlier, it is not necessary that the clips 18–19 be arranged in opposed pairs as shown in FIG. 7 but can be staggered in alternating fashion as they project from opposite sides of the track.

Furthermore, the number of clips and the number of bulges is a matter of choice so long as there are sufficient restrictions between cooperating clips and mating bulges to create adequate friction for insert retention.

Frequently it is desirable to create a stop in the track opposite the inlet end as indicated at 24 in FIG. 4 to prevent overfeeding of the shaving aid insert.

Figure 2:
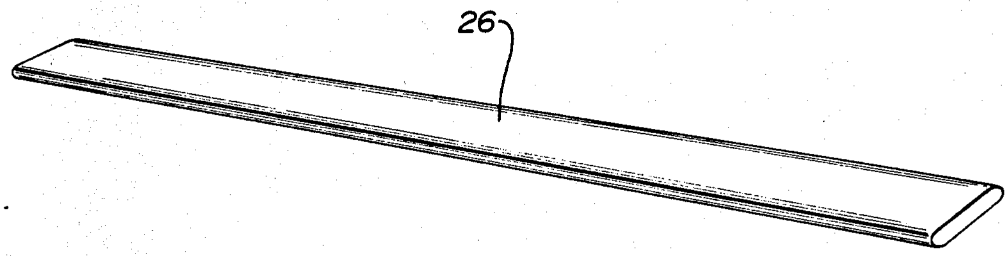
FIG. 2 is an enlarged perspective view of a molded shaving aid of indeterminate length.

FIG. 2 shows an elongate shaving aid 26 of indeterminate length created by extrusion, injection molding or the like.

Figure 3:
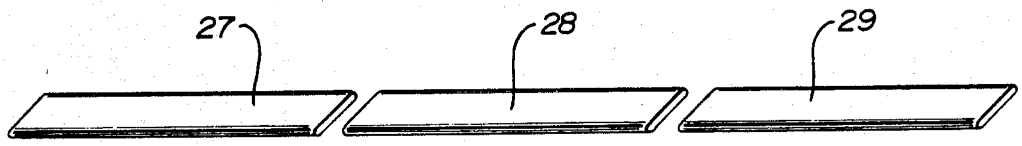
FIG. 3 is a view similar to FIG. 2 showing the elongate aid of FIG. 2 separated into individual inserts or shaving aid units.

FIG. 3 shows the step of separating the elongate aid 26 into individual inserts 27, 28 and 29. These inserts are schematic representations of the insert 17 shown being fed into the track of FIGS. 4 and 5 and illustrated in cross-section in FIG. 7.

It is anticipated that a wide variety of embodiments and design changes may be devised in the disclosed and claimed invention without departing from the spirit and scope thereof.

For example, it is anticipated that there are numerous shaving aids or shaving aid compositions that can be fabricated for wet shaving cartridges in accordance with the article and method claims hereof.

Machine design considerations may require reversing the feed entry of the insert and correspondingly reversing the overfeeding stop.

In addition, it may be necessary to incorporate stops at both ends of the recess to keep the insert from "walking out" of the recess due to vibrations encountered during transport of the razor product in commerce.

What is claimed is:

1. A method of attaching an, elongate shaving aid to a face-engaging surface of a razor cartridge comprising:

(a) creating a track in said face-engaging surface, said track including a flared inlet side with spaced restrictions created by bulging spaced portions of said track therein, said track also formed with a stop opposite said inlet, (b) forming said elongate shaving aid by extrusion molding then feeding said shaving aid insert into said track until the end of said insert abuts the stop opposite said inlet; and (c) frictionally retaining said insert in said track.

2. The method of claim 1 in which the molding step is accomplished by extrusion.

3. The method of claim 1 in which performance of the track is enhanced by forming spaced clips in said face-engaging surface.

4. The method of claim 3 plus the step of locating the spaced clips in the region of the bulging portion of said track.

5. The method of claim 3 plus the step of arranging the spaced clips in pairs so that the clips project toward one another from opposite sides of the track.

* * * * *